United States Patent
Shipley et al.

(10) Patent No.: US 12,400,213 B1
(45) Date of Patent: Aug. 26, 2025

(54) TEMPORARY DEBIT CARD SYSTEM AND METHOD

(71) Applicant: UIPCO, LLC, San Antonio, TX (US)

(72) Inventors: Brian Francisco Shipley, Plano, TX (US); Priyadarshini Badugu, Frisco, TX (US); Ivan Ortiz, Little Elm, TX (US); Sean Carl Mitchem, San Antonio, TX (US); Jennifer Anne Scamardo, Frisco, TX (US); Janell Guzman, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 13 days.

(21) Appl. No.: 18/192,926

(22) Filed: Mar. 30, 2023

Related U.S. Application Data

(60) Provisional application No. 63/362,198, filed on Mar. 31, 2022.

(51) Int. Cl.
  *G06Q 20/34* (2012.01)
  *G06Q 20/10* (2012.01)
  *G06Q 20/40* (2012.01)

(52) U.S. Cl.
  CPC ......... *G06Q 20/34* (2013.01); *G06Q 20/1085* (2013.01); *G06Q 20/40145* (2013.01)

(58) Field of Classification Search
  None
  See application file for complete search history.

(56) References Cited

U.S. PATENT DOCUMENTS

| | | | |
|---|---|---|---|
| 10,186,266 B1 * | 1/2019 | Devaraj | G06F 3/167 |
| 2012/0047075 A1 * | 2/2012 | Balistierri | G06Q 20/3829 |
| | | | 705/35 |
| 2016/0125367 A1 * | 5/2016 | Bowles | G06Q 20/321 |
| | | | 705/14.11 |
| 2017/0344990 A1 * | 11/2017 | Kohli | G06Q 20/326 |
| 2018/0239506 A1 * | 8/2018 | Arzoumanian | G07C 9/30 |
| 2022/0021763 A1 * | 1/2022 | Zhang | G06F 3/04883 |
| 2022/0067699 A1 * | 3/2022 | Wong | G06Q 20/341 |
| 2022/0335407 A1 * | 10/2022 | Todmia | G06Q 20/355 |

FOREIGN PATENT DOCUMENTS

WO  WO-2010079483 A1 *  7/2010  ............. G06K 19/07

OTHER PUBLICATIONS

"Bhavani A and Jancy J, Fingerprint Based ATM System, Apr. 2021, Department of Electronics and Telecommunication Engineering, Sathyabama, 24-30."(Year: 2021).*

* cited by examiner

*Primary Examiner* — Mike Anderson
*Assistant Examiner* — Toan Duc Bui
(74) *Attorney, Agent, or Firm* — Plumsea Law Group, LLC

(57) ABSTRACT

A method and system for managing and providing access to a temporary debit card is disclosed. The embodiments provide a system that authenticates remote users of an ATM kiosk who request a temporary debit card. The authentication occurs by capture of biometric data or a specially generated signal from their mobile device transmitted to the kiosk. In one example, the biometric data is compared to a reference biometric pattern. Where the system determines the biometric patterns match, or if the mobile device-generated signal is verified, a signal approving the request is transmitted from the system to the kiosk, causing the kiosk to fabricate a temporary debit card.

15 Claims, 12 Drawing Sheets

TEMPORARY DEBIT CARD SYSTEM AND METHOD

CROSS-REFERENCE TO RELATED APPLICATION

This application claims the benefit of U.S. Provisional Patent Application Ser. No. 63/362,198 filed on Mar. 31, 2022 and titled "Temporary Debit Card System and Method", the disclosure of which is incorporated by reference herein in its entirety.

TECHNICAL FIELD

The present disclosure generally relates to providing access to temporary debit cards, and in particular to an apparatus configured to fabricate a debit card following authentication of an authorized account holder.

BACKGROUND

Financial institutions provide credit cards and debit cards to consumers to enable consumers to access credit and/or money on account. However, credit cards and debit cards are sometimes lost or stolen. In addition, there are many who believe that a debit card carries a greater risk because if a loss occurs, the user's own money is stolen, rather than a credit charge that can be disputed. This is because debit cards are linked to a person's checking account and have the potential to drain the funds in real time. The account holder may not even notice the depletion of their account for several days, which can lead to loss of a reporting window.

Credit card charges, on the other hand, do not carry that same risk: an erroneous charge on a monthly credit card statement can be disputed weeks or months after the charge is noticed. Debit card loss is immediate and can adversely impact a consumer. Even though debit cards require entry of a PIN in order to authenticate a transaction, in some cases an unauthorized person may somehow acquire the PIN, possibly by using a skimmer at an ATM, for example. Chip cards that are designed to be read using RFID technology can store information that might be stolen by unauthorized persons using illicit RFID devices that, for example, could emulate chip readers. This stolen card data could then be used to consummate fraudulent transactions such as the purchase of expensive consumer products, or to withdraw funds from bank accounts, for example. Such transactions can occur many miles from the home of the account holder. Thus, even debit cards may be vulnerable to fraudulent activities.

In many cases, users will switch to carrying a more restricted ATM card that limits the use of the card to making cash withdrawals for such security reasons, or avoid such cards altogether. However, there are situations in which a person may desire only occasional access to the features of a debit card, without the concern of carrying or maintaining the card securely indefinitely. In addition, there are situations where a person may simply forget their wallet or debit card at home, but be shopping and desire the ease of carrying a debit card for the day (rather than simply withdrawing and pocketing large wads of cash for use during their excursion) and help them maintain automated records of their transactions.

There is a need in the art for a system and method that addresses the shortcomings discussed above.

SUMMARY

In one aspect, a computer-implemented method of providing access to a temporary debit card by on-site fabrication of a debit card linked to a specific account. The method includes a first step of receiving, at a remote server and from a computing device for a kiosk associated with a financial institution, a first biometric pattern (i.e., a digital measurement of a person's physical features or characteristics), and a second step of accessing, via the server and in response to receiving the first biometric pattern, a second biometric pattern. A third step includes determining, at the server, the first biometric pattern is sufficiently similar to the second biometric pattern so as to be classified as a match. In addition, a fourth step includes transmitting, from the server and in response to determining there is a match, a first signal to the kiosk computing device, the first signal causing a debit card fabrication device of the kiosk to produce a temporary debit card.

In another aspect, a computer-implemented method of producing a temporary debit card includes a first step of receiving, at a remote server and from a computing device for a kiosk associated with a financial institution, first data transmitted via a near-field communication (NFC)-based signal from a mobile device to the kiosk computing device, verifying, at the server, the first data, and transmitting, from the server and in response to verification of the first data, a first signal to the kiosk computing device. The first signal causes a debit card fabrication device for the kiosk to produce a temporary debit card.

In another aspect, a system for providing access to a temporary debit card is disclosed. The system comprises a processor and machine-readable media including instructions which, when executed by the processor, cause the processor to receive, at a remote server and from a computing device for a kiosk associated with a financial institution, a first biometric pattern, and to access, via the server and in response to receiving the first biometric pattern, a second biometric pattern. In addition, the instructions cause the processor to determine, at the server, the first biometric pattern is sufficiently similar to the second biometric pattern so as to be classified as a match, and transmit, from the server and in response to determining there is a match, a first signal to the kiosk computing device, the first signal causing a debit card fabrication device for the kiosk to produce a temporary debit card.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The proposed embodiments describe a system and method for providing members of a financial institution a mechanism by which to obtain a temporary debit card at an ATM. In one example, a user who needs a debit card to make a purchase could simply travel to a nearby ATM and request a temporary card. In different embodiments, the user could be verified using biometrics or an NFC signal generated through the user's phone could authenticate the user by placing the phone near the ATM. In some cases, the temporary cards could be configured with transaction limits, geofenced areas for making purchases, and/or may expire after a shortened period compared to conventional debit cards. The ATM would include provisions for fabricating a temporary debit card that is linked to the user's account and includes restrictions selected by the user or automatically applied by the financial institution.

Figure 1A:
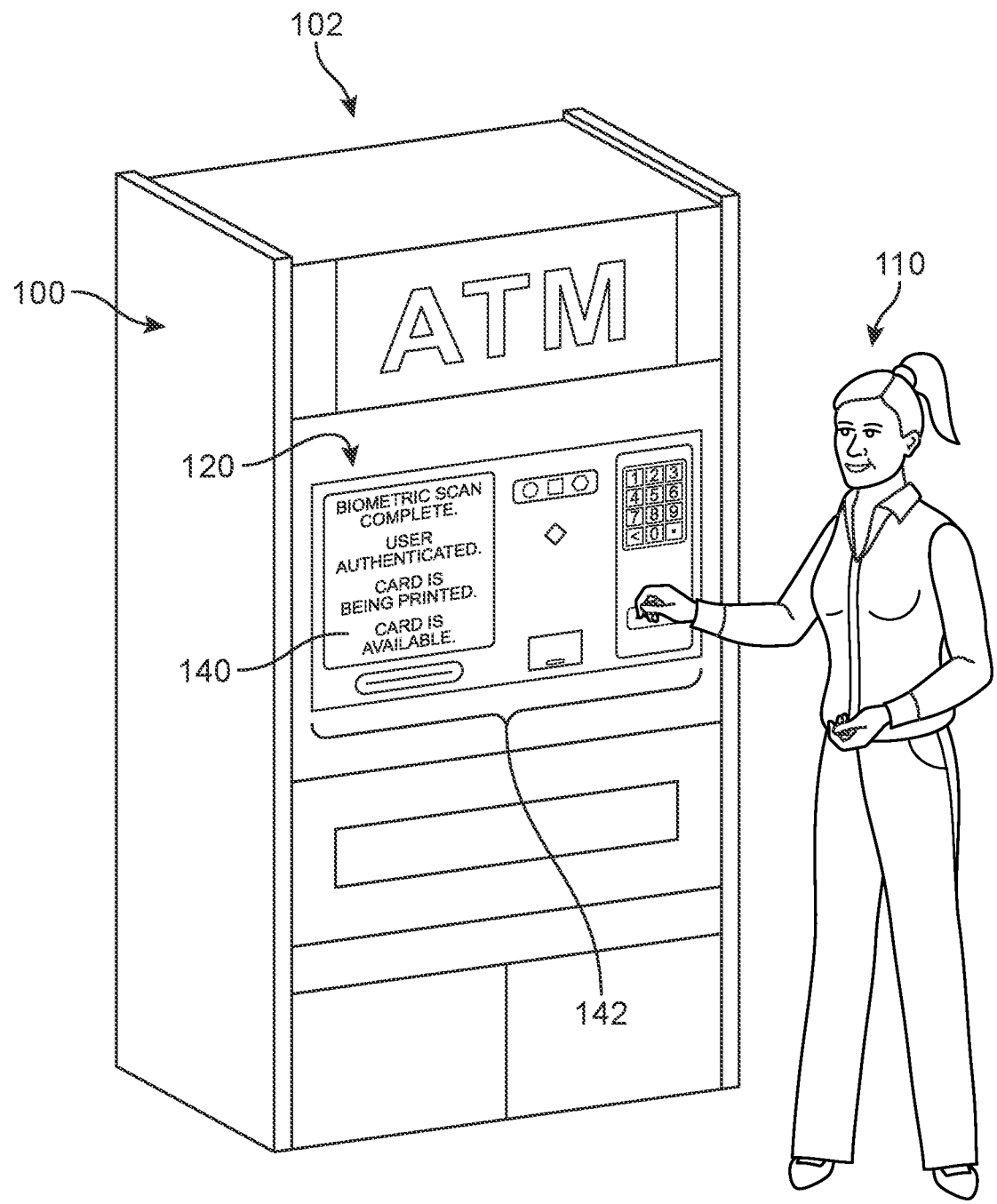
FIGS. 1A and 1B depict an example of a first person using an ATM kiosk to produce a temporary debit card, according to an embodiment.

For purposes of introduction, an overview of one embodiment of the proposed systems and methods is illustrated with reference to FIGS. 1A and 1B. FIG. 1A depicts a first user 110, such as an account holder, approaching a banking kiosk 102 in which a first automated teller machine (ATM) 120 is installed. In different embodiments, kiosk 102 may comprise an enclosure 100 along with various components and resources that provide banking services for users. In some cases, kiosk 102 could be a stand-alone structure. In other cases, kiosk 102 could be part of a larger building or other structure. The enclosure may provide systems to facilitate banking transactions. As seen in FIG. 1A, an exterior of the enclosure may include an access portal to the first ATM and components thereof. Some embodiments of the first ATM 120 may include components to provide videotelephony. In other cases, the first ATM 120 may be comprised of standard interactive features for viewing and accessing services related to banking. Thus, for purposes of this application, the term kiosk can be understood to be interchangeable with the terms enclosure and/or housing.

In different embodiments, the kiosk 102 may communicate (via its computing system) with a server via a network. The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols. In some embodiments, the kiosk 102 can be connected to the network through a hardwire connection or wirelessly. Similarly, the server can be connected to a network via a hardwire connection or wirelessly. The server can be used to manage the activity of kiosk 102 and/or to send and receive information to and from kiosk 102. In many cases, the kiosk 102 is designed to be unmanned and/or operated remotely. Thus, kiosk 102 may be potentially operational at any time, and can host interactive sessions 24 hours per day, 7 days a week.

Furthermore, the functionality of first ATM 120 is provided by an interactive system that may be accessed by a user via a display screen 140 (or a projected image created by an image projecting device). The first ATM 120 may also include or be in communication with one or more slots for scanning, printing, or providing storage for documents, and/or other slots that may provide provisions for the occupant to deposit or withdraw funds in the form of paper money (and/or checks for deposits). Collectively, the display screen 140 and components configured for user interaction will be referred to as a user interface assembly 142.

Figure 1B:
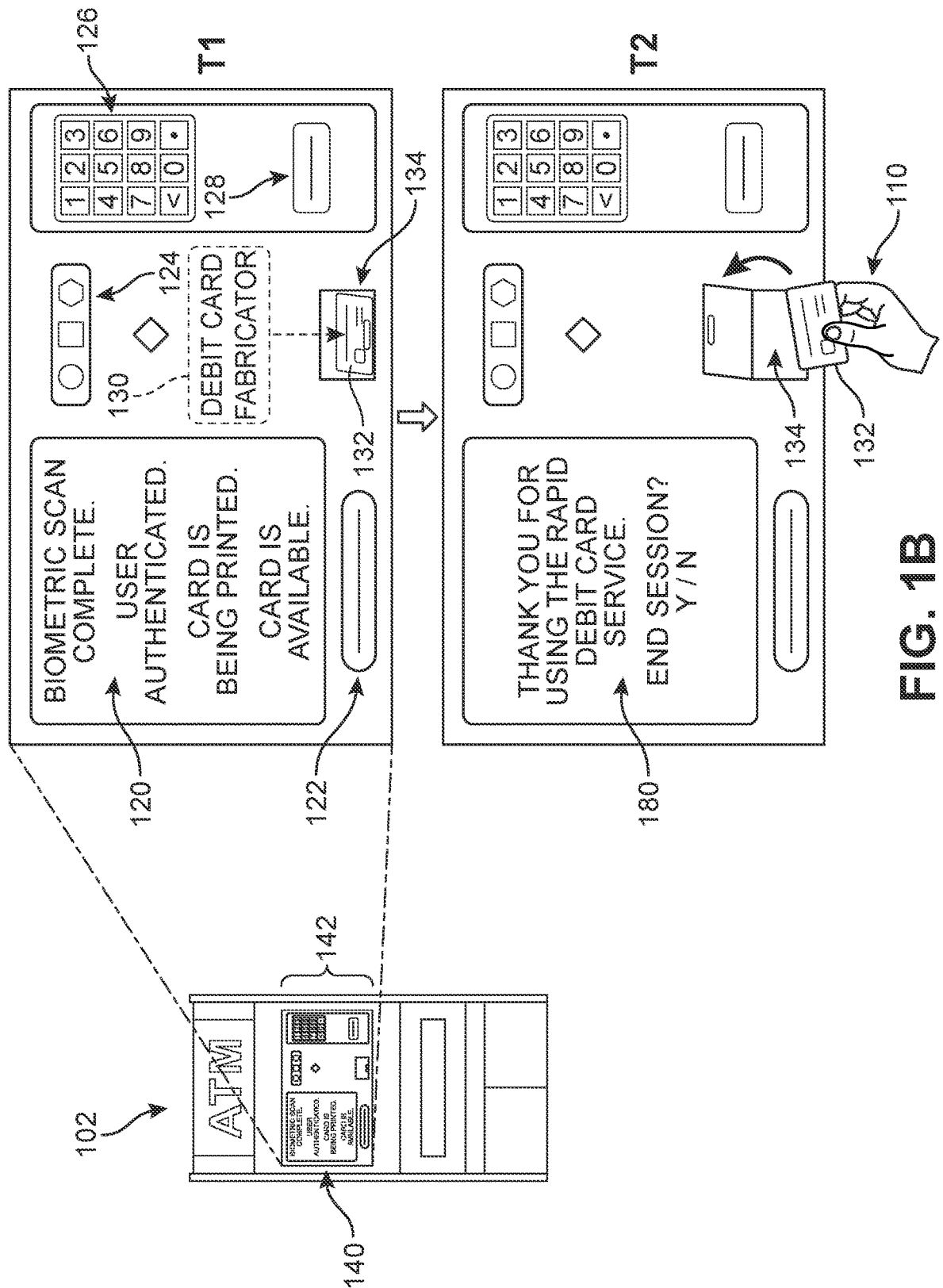

Referring to FIG. 1B, an isolated view of the kiosk 102 is presented, with the user interface assembly 142 shown in a magnified view at a first time T1 and at a second time T2. By first time T1, it can be understood that the first user 110 has requested the temporary debit card and underwent a biometric scan via one or more sensors 124, shown here as arranged in a sensor panel, such as a retinal scanner, fingerprint scanner, and facial recognition image capture. In other examples, sensors 124 could include a camera and a microphone, for example. A camera may capture still or video images of a user that can be transmitted to a server or other party outside of kiosk 102. Likewise, microphones can capture audio that can be transmitted to a party, such as an employee of a bank, outside of kiosk 102. In some embodiments, sensors 124 includes a motion sensor that detects movement in the area near the ATM 120.

The user interface assembly 142 can also include a keypad 126 by which a user can enter information (this may also or alternatively be provided by a touchscreen interface of the display screen 140), a card reader 128, and a dispenser 122 (e.g., for cash). In addition, in different embodiments, the kiosk 102 includes provisions for producing user account specific tangible debit cards via a debit card fabricator device 130, shown schematically by dotted lines as residing in an interior compartment. Once the first user 110 has been authenticated, as represented by a first message 120 ("Biometric scan complete. User authenticated. Card is being printed. Card is available") that informs the first user 110 of the status of their card production, a first temporary debit card ("first card") 132 is ejected out of or otherwise released into a slot 134. At second time T2, the first user 110 reaches toward the slot 134 and acquires the first card 132. A second message 180 ("Thank you for using the rapid debit card service. End session Y/N") is now presented.

Thus, the first user 110, who was not carrying a debit card, is now in possession of a debit card. As will be discussed in greater detail below, the debit card produced by this type of system can be configured to function with only limited features, and/or be protected by applying restrictions with respect to the period of time, location, or amount of use that is permitted before the card is deactivated. In another example, the debit card can be linked to a PIN that is generated by the system and shared only with the user (e.g., as a text or email) via their registered mobile device or email account.

Figure 2:
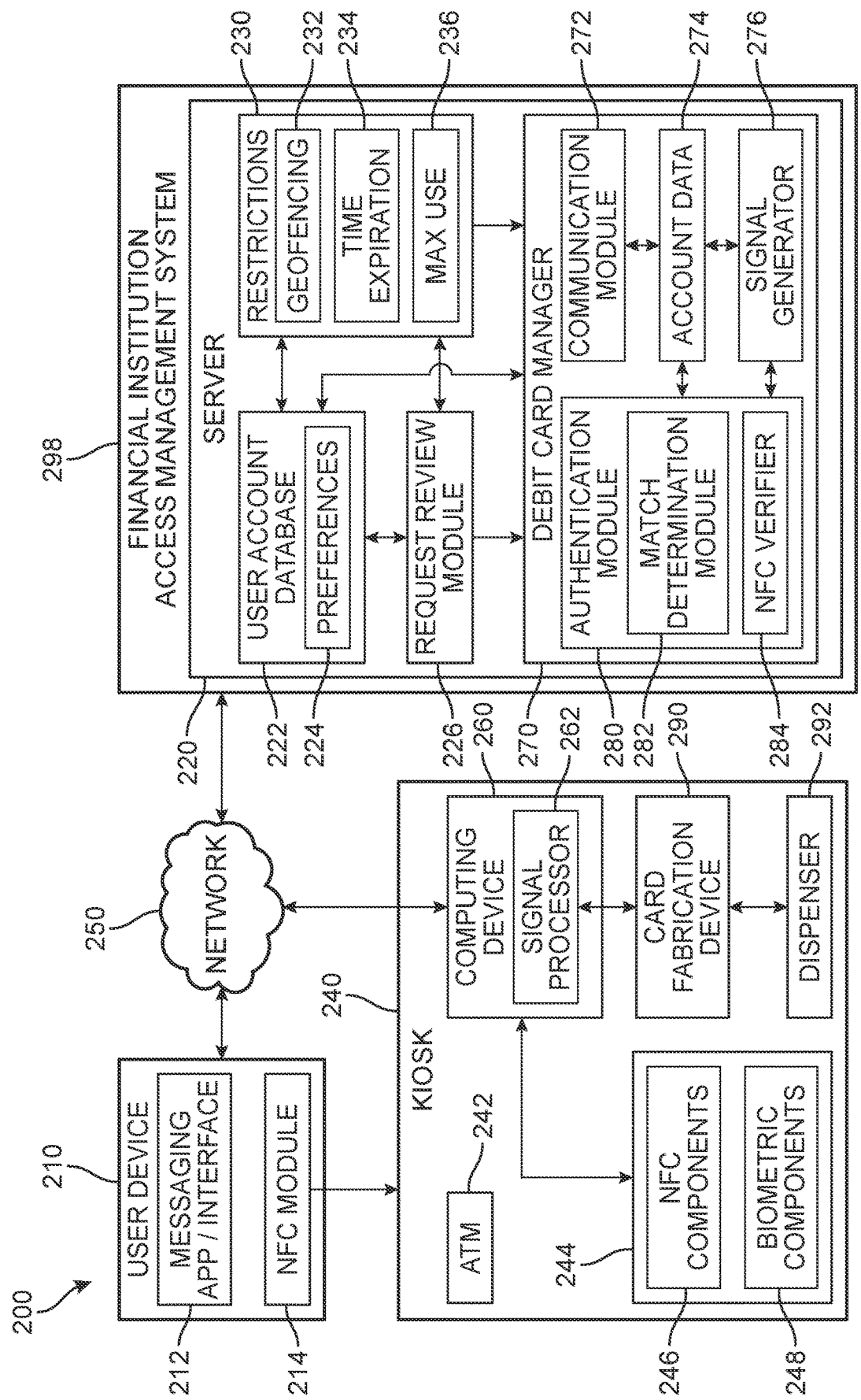
FIG. 2 is a schematic diagram of an environment for temporary debit card access management, according to an embodiment.

In order to provide the reader with a greater appreciation of the embodiments, FIG. 2 depicts an embodiment of an environment 200 for a debit card access management system in which user data is captured and used to verify their identity for purposes of supplying the user with a temporary debit card. It should be understood that the environment 200 is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIG. 2. In this figure, the environment 200 includes a user device 210, a remote server 220 for an access management system 200 of (or employed by) the financial institution, and an on-site computing system 260, typically residing in a kiosk 240 associated with an ATM 242. It should be understood that the term "computer system" refers to the computing resources of a single computer, the partial computing resources of a single computer, a plurality of computers communicating with one another, or a network of remote servers. In one embodiment, computer system 260 includes at least one server having at least one processor.

In different embodiments, devices and components of environment 200 can communicate with each other and with other components of environment 200 over one or more networks (shown here as network 250). The network 250 may comprise any number of electronic devices and use any number of communication protocols to facilitate data communications within the network 250. One having skill in the art would appreciate that the network 250 may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network 250 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 250 may include a physical and/or logical architecture defined by firewalls, proxy servers, routers, switches, or similar features that implement various levels of security and my function as logical gateways or boundaries.

As noted earlier, the proposed systems and methods can be configured to verify a user's identity in order to authorize the fabrication with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments may be used as a layer of security in addition to conventional methods such as the three categories described above (e.g., in addition to passwords, pins, ID card, biometric factors, etc.).

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm or a change in facial expression) are passive interactions, as the person could perform these activities regardless of the authentication system that is in place.

In different embodiments, following a request from a user for a temporary debit card at the kiosk 240, a debit card manager 270 of system 298 can be configured to initiate an authentication event session in conjunction with the computing device 260. It should be understood that although the debit card manager 270 and components thereof are shown as residing entirely in server 220, in other embodiments, one or more components of the debit card manager 270 can be stored on the local computing device 260, or at some other remote location.

In some embodiments, the user-initiated request is transmitted via network 250 to the server 220, which determines via a request review module 226 and with reference to a user account database 222, whether the account associated with the debit card request has (previously) agreed or otherwise consented to the temporary debit card service. If so, the user's stored biometric reference data, as well as the user's preferences 224 (e.g., a preferred manner of authentication, and what limitations or restrictions are to be imposed on the card), are accessed from a record securely maintained in association with the user's account in the user account database 222.

In other words, if the request for the temporary debit card is approved by the request review module 226 as being enabled or otherwise permissible for the selected account, the debit card manager 270 will obtain the necessary biometric reference data from the user account database 222 that enables the authentication process to be performed. As noted earlier, authentication of a person can be based on one or more types of data. For example, biometric data can be obtained by the computing system 260 via one or more biometric components 248 associated with the kiosk 240, including but not limited to devices that are designed to verify a user's identity through unique biological traits such as retinas, irises, voices, facial characteristics, and fingerprints. Thus, the term biometric components can also be referred to as biometric data capture devices or biometric input devices. Biometric authentication systems store this biometric data in order to verify a user's identity when that user accesses their account. Because this data is unique to individual users, biometric authentication is often considered more secure than traditional forms of multi-factor authentication. Biometric authentication is a security process that relies on the unique biological characteristics of an individual to verify that he is who he says he is. In different embodiments, biometric identifiers can be acquired and screened through fingerprint scanners, retina and/or iris recognition, voice detection, facial recognition, and/or liveness detection (e.g., when a biometric authentication system verifies that a captured image of a person is indeed that person in the flesh and not a still or flat image).

In different embodiments, an authentication module 280 of the debit card manager 270 can receive the captured biometric data. A match determination module 282, implementing biometric authentication technology, compares the captured biometric data to stored, confirmed authentic data (reference biometric data) received from user account database 222. The term biometric signal or biometric data refer to an identifier that is associated or linked to an individual human and serve as a reliable authentication factor. The biometric signal can be stored in a database and represent or be included in an authentication record that will be linked to the account of the person (including identification data) who participated in an identity verification training session, and be made available for use by the system during subsequent authentication sessions. In general, biometric authentication works by comparing two sets of biometric data, where the first one is preset by the owner of the device or account, while the second one belongs to a device visitor or person seeking to access the account. The match determination module 282 will make a decision. If the two sets of data match, the user can be authenticated and the process with continue.

In addition, in different embodiments, the user may opt to provide biometric updates at different intervals. For example, the user may lose or gain weight, have surgery, be in an accident, or experience some other change that may affect the validity of the biometric data as previously stored, and therefore he/she may request to submit new data. This can occur at an on-site location for the financial institution in order to ensure the enrollment of data is authentic. In one embodiment, the temporary debit card consent can be linked to an expiration date or period of time after which the participant will be required to renew their agreement to the service.

In different embodiments, image signal processing algorithms and/or software may be accessed by match determination module 282, for example when performing facial recognition. In one example, the image input can be cleansed and normalized by an image processing module. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual or haptic signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur.

In some embodiments, the captured biometric data is processed and models or representations of the image are built. These models are compared against one another. In different embodiments, one or both samples may be deemed unacceptable or unusable if the resultant input is too bright or too dark, or if there is too much noise (poor signal to noise ratio). If a sample is not acceptable the system may request an additional or further sample. If the data is acceptable or sufficient, a scoring occurs via the match determination module 282. In one example, the scoring process is analogous to "what is the probability that the data captured by the computing device 260 are the same as the verification reference sample that is stored in the user account database?" Thus, in some embodiments, the determination of a "match" is not necessarily based on the verification/reference sample directly or exactly matching, but rather on the two samples being substantially similar or sharing particular features. The returned score is evaluated against a threshold value to determine if it meets or exceeds the minimum acceptable score. If the score is determined to be successful, the process can continue. Otherwise, access is denied, or blocked pending further verification. In some embodiments, the system is configured to then automatically generate a message indicating an unauthorized attempt to access the service may have occurred. In some embodiments, this message can be automatically transmitted by a communication module 272 to the user device 210 or account address for the registered user. Thus, a real-time authentication factor such as a fingerprint can be compared to a previously acquired fingerprint authentication template (biometric reference models).

In addition, as noted earlier, in some embodiments, other authentication techniques may be implemented. For example, in cases where the debit card requester ("user") has access to user device 210, an authentication process using a signal transmitted from the user device 210 to an NFC receiver component 246 at the kiosk can be facilitated. The user device 210 can include a tablet, a laptop, a smartphone, a desktop computer, a smart device, or similar kind of device that allows a user to transmit a signal to the computing system 260 and/or communicate data to/from server 220. In different embodiments, the user device 210 can include an electronics unit comprising a plurality of different components, such as one or more of various user interface components (e.g., a touchscreen display, keyboard, mouse, microphone, camera, speaker, etc., a user interface module, a processor, and/or a communication module. These devices may include a system including one or more processors and memory. Memory may comprise a non-transitory computer readable medium. Instructions stored within memory may be executed by the one or more processors. The user device 210 may be configured to receive and analyze data from various input sensors associated the device or data that is communicated from external components or devices to the device. In some cases, the user device 210 may also include a navigation system equipped with a GPS receiver that can receive GPS information or other receivers capable of receiving global or local positioning information.

A communication module may allow the user device 210 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the user device 210 may include a device display ("display") that can, for example, present information and various media for a debit card access management software application ("app") 212. In some embodiments, the app 212 is associated with the financial institution or other provider of the service. In some embodiments, the display may be a touchscreen, allowing the customer to interact with the user interface directly by touch. The user interface may refer to an operating system user interface or the interface of one or more software applications that may run on the user device 210. In some embodiments, the user interface can include a messaging window or other chat-space by which the user could send messages or other digital content. Alternatively, in some embodiments, a user could also submit data through the app 212 for purposes of authentication.

Thus, a user may approach the kiosk 240 and cause their user device 210 to transmit a secure NFC signal via an NFC module 214. The acronym "NFC" as used herein refers to "Near-field Communication," which typically uses 13.56 MHz electromagnetic waves. In one embodiment, the signal is generated or otherwise provided by the app 212. In different embodiments, the user may activate the app simply by clicking on the app on the user's smart phone, initiate a request, and then bring the smart phone in close proximity to the NFC component 246 of kiosk 240. Once the request is received, and the smart phone is in sufficiently close proximity to the kiosk 240, the smart phone (user device 210) and the NFC component 246 can interact with each other so that the signal can be sent to debit card manager 270 for review. In some embodiments, the kiosk 240 include electrical circuits that can act as a passive Radio-Frequency Identification (RFID) tag, that is energized by electromagnetic waves broadcast by the smart phone and coupled to electrical circuits in the smart card. In one example, the kiosk 240 can include a chip that is connected to an antenna for receiving NFC electromagnetic waves broadcast by the smart phone.

In other embodiments, instead of using electromagnetic waves at the NFC frequency, the electromagnetic waves may be broadcast at another frequency, such as at a Bluetooth frequency of 2.4 to 2.5 GHZ, or at an LF frequency in the 120 to 150 KHz range. The electromagnetic waves could also be broadcast at any other frequency that might currently or in the future be used by the smart phones, such as, for example, 850 MHZ, 900 MHZ, 1,800 MHz and 1,900 MHz frequencies, or any other frequencies that may be developed for possible use by smart phones in the future.

The electromagnetic waves broadcast by user device 210 may carry data such as the smart phone's number and/or IP address and may also include additional data, such as a personal identification number or PIN, fingerprint data, voice data, password data and/or facial recognition data. The signal is received by a signal processor 262 of the computing device 260, which can either determine locally whether the signal is authentic, or can convey the signal to an NFC signal verifier module 284 of the authentication module 280. If the NFC signal is verified, the debit card manager 270 can allow the process to continue. If the NFC signal is incorrect, access to the temporary debit card service is denied, or blocked pending further verification.

Once authentication is complete, the debit card manager 270 proceeds by requesting user account information necessary to generate a debit card for the user ("account data 274") from the user account database 222. As noted earlier, the user accounts database 222 can include or have access to a content library that stores account data related to one or more users. The data may include, for a plurality of users, name, personal and professional details, user biometric data, current and past policy for the user, credit limit of users, among other details. In some embodiments, a smart device registry stores information for known (registered) user devices for which the user has authorized and enabled the input and execution of an NFC-based request/authentication event.

In some embodiments, the system 298 may also refer to one or more restriction rules 230 when determining what type of debit card should be provided. For example, a user may indicate a preference for a card that expires after 24 hours (time expiration 234). In another example, the user may indicate that the card should only be active while being used at merchants in a specific geographical area (geofencing 232). In yet another example, the user can specify the maximum amount of money that can be released using the debit card, regardless of whether the account holds more money than the selected amount (max use 236). In addition, in different embodiments, the system can require the application of one or more of these restrictions, or apply them as a default unless the user expresses a different preference.

Once the account data, preferences, and restrictions are received by the debit card manager 270, a control signal can be generated by a signal generator 276 of the debit card manager 270 that includes the necessary data to generate a debit card for the account and a command to begin fabrication. The signal is received by the signal processor 262 of computing device 260, which responds to the command by sending a control signal to card fabrication device 290. In addition, the computing device 260 provides the user-specific account information to enable the card fabrication device 290 to store or otherwise configure the card with the appropriate settings and account access.

Figure 3:
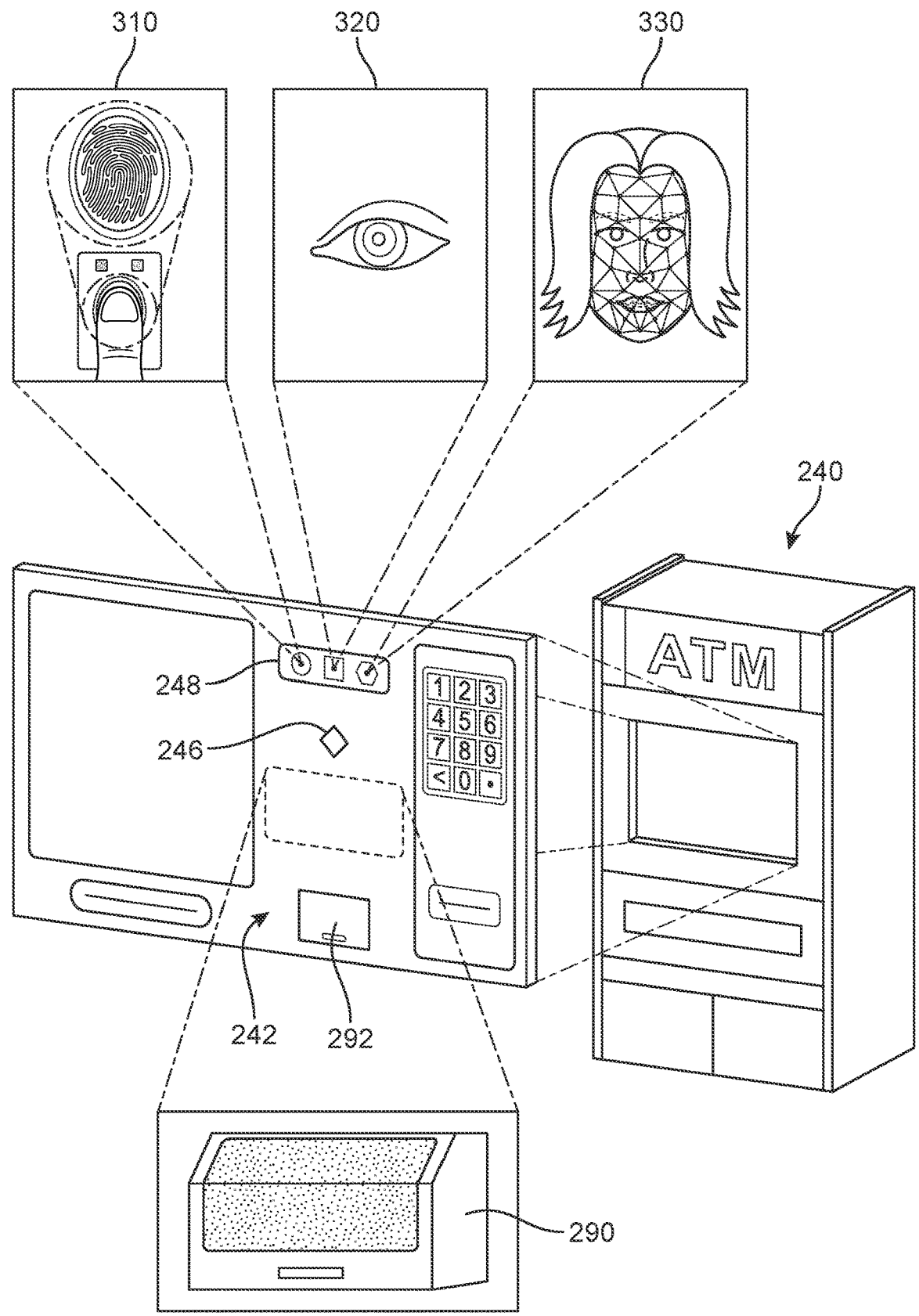
FIG. 3 is a schematic diagram depicting an apparatus for producing temporary debit cards, according to an embodiment.

Referring now to FIG. 3, an embodiment of kiosk 240 with ATM 240 is depicted. The kiosk 240 includes a panel in which input capture portions of biometric components 248 are arranged, as well as NFC component 246. For purposes of illustration, the biometric components 248 can be seen to include a fingerprint scanner 310 (for fingerprint recognition and/or finger geometric recognition), an eye scanner 320 (for iris recognition and/or retina recognition), and a facial recognition scanner 330. In other embodiments, other types of mechanisms to enable different biometric verification methods may be incorporated into the kiosk 240, including but not limited to voice recognition technology (e.g., voiceprint matching), ear identification technology, hand geometry recognition, vein recognition, and signature recognition technology. The input captured by one or more of these components can be received by the local computing device for processing and sent to the debit card manager. As noted earlier, via one or more of these components (scanners, sensors, and other readers), a person's biometric data is stored in a database. The system saves this information, such as a fingerprint, and converts it into digital data. Then, when the finger is placed back on the scanner, the system compares the new data with what is stored in its database. Finally, the system will either confirm the person's identity and grant them access if there is a match or decline the request if not. The kiosk 240 further includes card fabrication device 290, which is configured to receive instructions from the local computing device 260 (shown in FIG. 2) in order to manufacture and produce a temporary debit card for the user. In some embodiments, once the card has been fabricated, the card can be dropped or pushed into the adjacent dispenser 292 for retrieval by the user.

Figure 4:
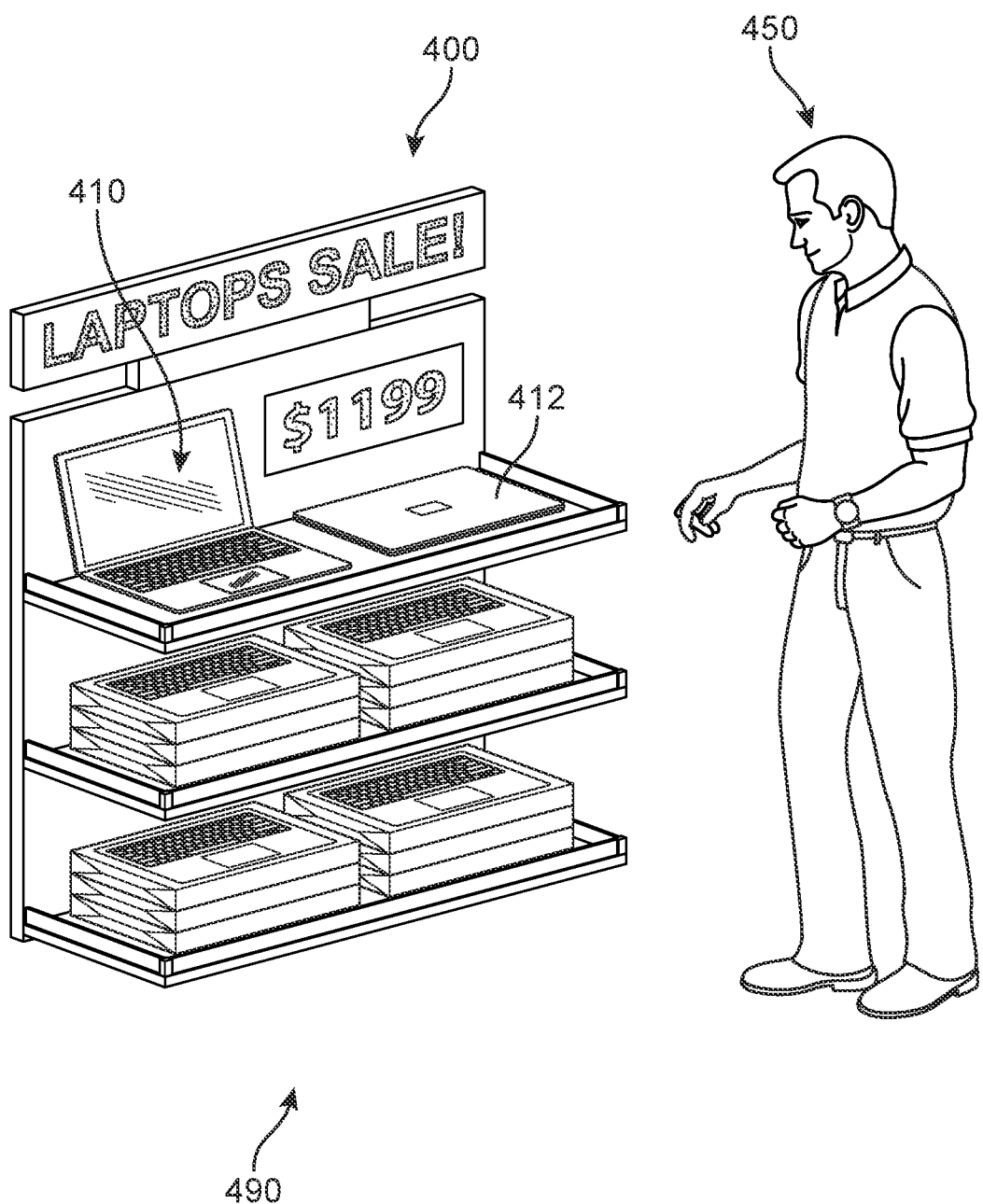
FIG. 4 is an illustration of a second person shopping at a store, according to an embodiment.

FIGS. 4-9 present a sequence of drawings illustrating a scenario in which an embodiment of the proposed systems is implemented. In FIG. 4, an account holder 450 of a financial institution such as a bank or credit union (e.g., "ABC Bank") is shopping in a store 400 at a first geographical location 490. The account holder 450 is not carrying his wallet, and realizes he has forgotten to bring any money to the store 492. However, for the account holder 450, the one-day sale of laptops 410, including a first laptop 412, is a deal they do not want to miss. Furthermore, in some cases, the desired item can be low in stock, such that a drive home and back again can risk the item being sold out before their return.

Figure 5:
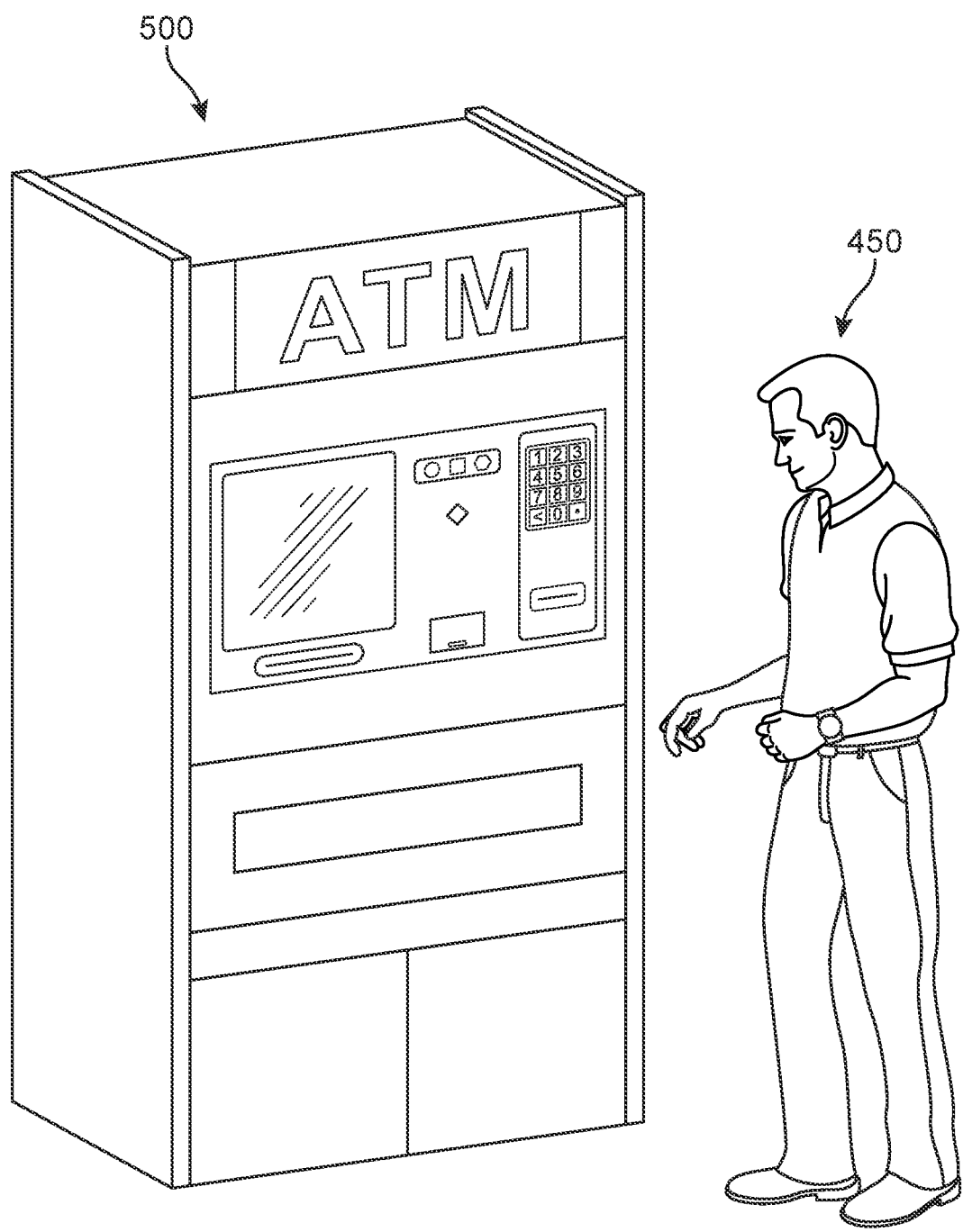
FIG. 5 depicts the second person approaching an ATM kiosk, according to an embodiment.
Figure 6:
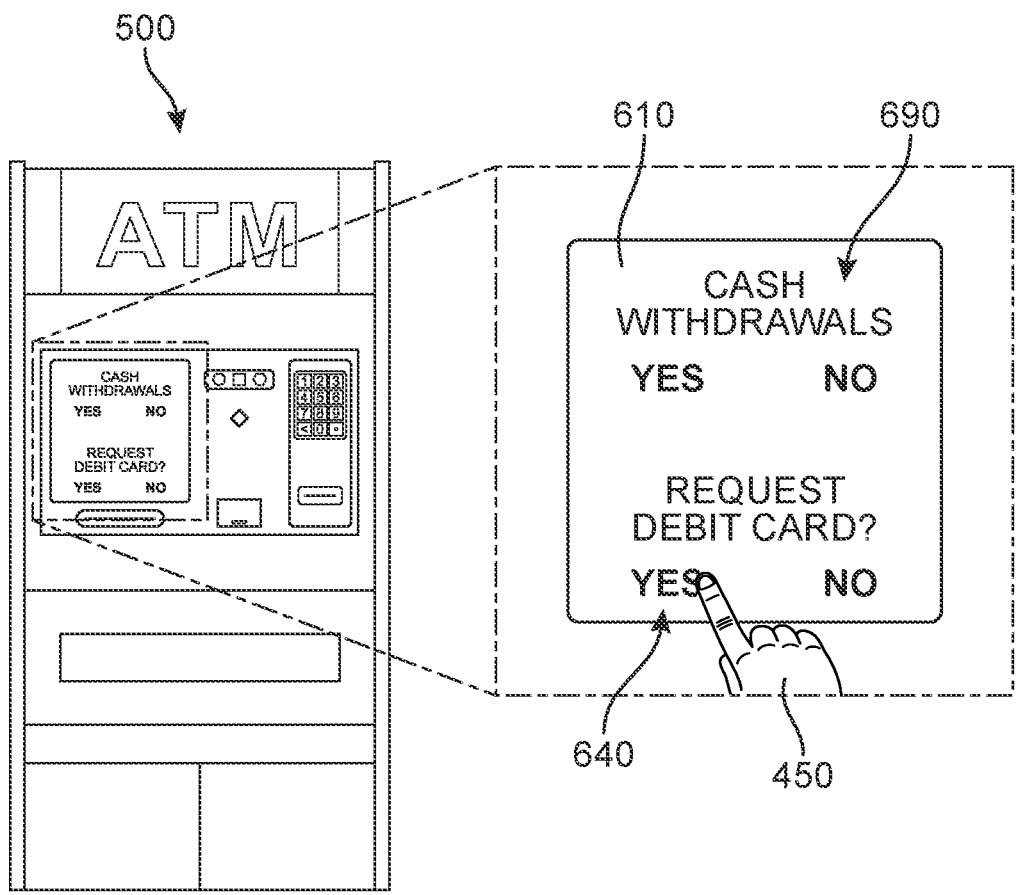
FIGS. 6 and 7 show the second person requesting a temporary debit card and then transmitting a signal to the kiosk for purposes of authentication, according to an embodiment.

The account holder 450 then walks to a nearby kiosk 500, as represented by FIG. 5. As he walks, he might anticipatorily pull out his mobile device 710 (see FIG. 7) from his pocket. In FIG. 6, the account holder 450 reviews a menu interface 690 ("Cash withdrawal? Yes/No Request Debit Card? Yes/No") on a display 610 of the kiosk 500, which is presented simply for purposes of this example. The account holder 450 makes a request for the debit card by selecting a first option 640.

In some embodiments, account holder 450 can then be asked to enter his/her name, account number, or other unique identifier, in order for the system to perform the authentication process. In one embodiment, the system can move immediately into a step of receiving biometric data to identify the user and then authenticate. Thus, the user may not be carrying any ID or device, but can simply approach the machine and present the appropriate input (e.g., face, hand, voice, etc.) and the system can search its account database to find a match. However, more typically, the user will first input some form of data by keypad or voice to reduce processing time and the amount of computational resources by limiting the match determination to a predefined target account.

Figure 7:
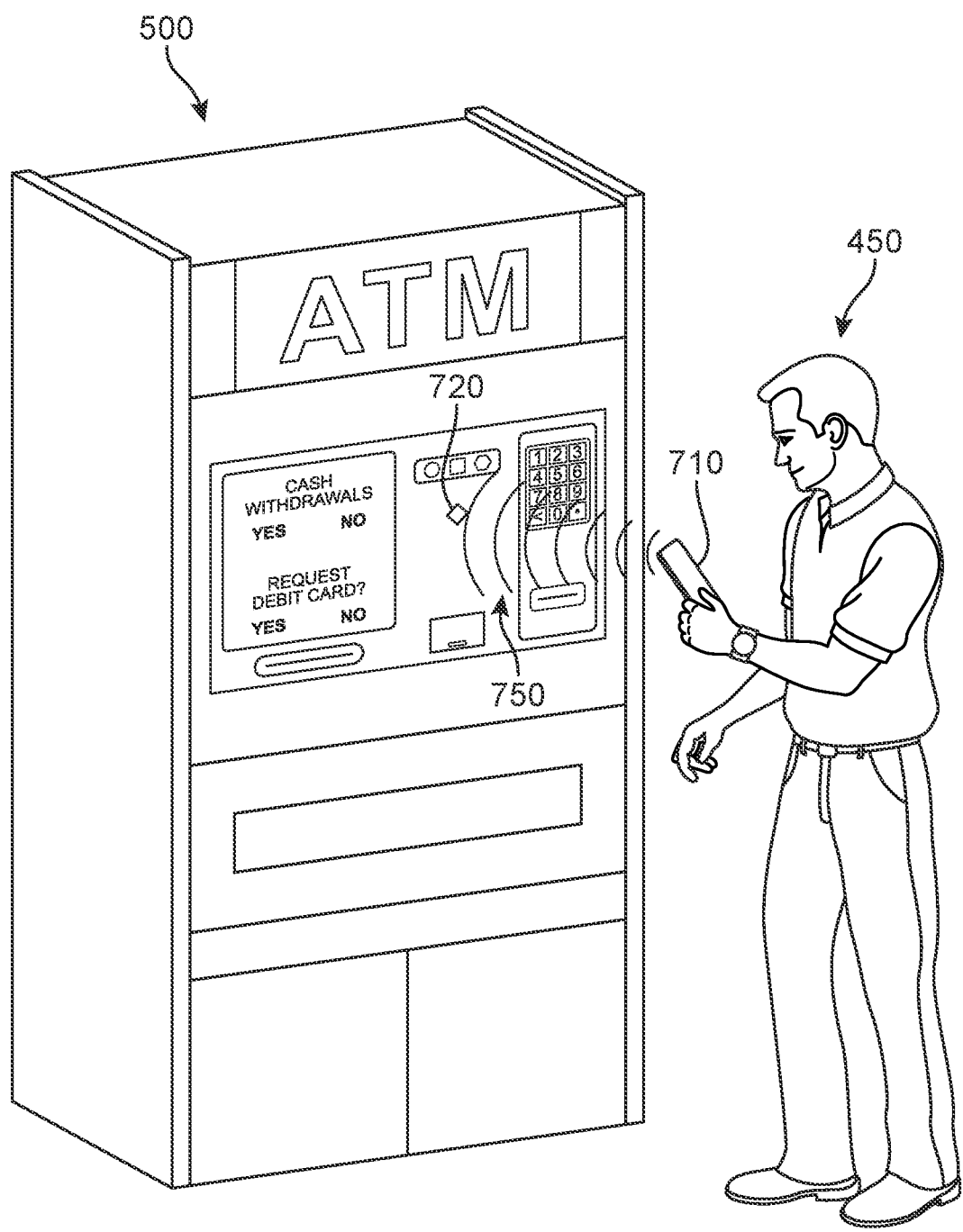
Figure 8:
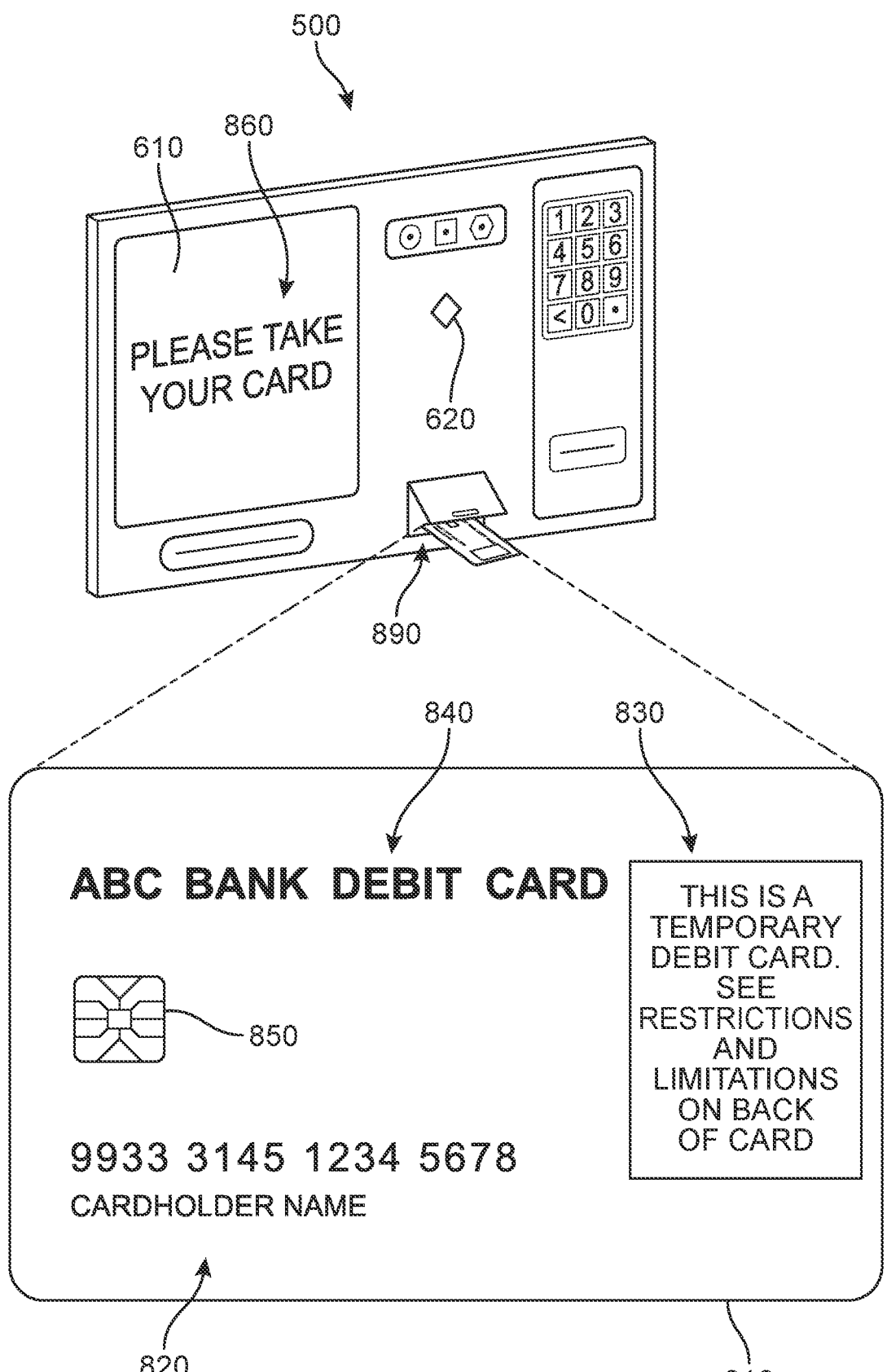
FIG. 8 is a schematic view of a portion of the kiosk as the temporary debit card is produced, according to an embodiment.

In another embodiment, shown in FIG. 7, the account holder 450 can access the authentication app from his mobile device 710, and coordinate the session through the app. In other words, the app can guide the user through the request by presenting a series of steps such as entering a password or other code (e.g., a code sent to his phone), or a facial recognition event. The app can then generate an NFC signal 750 which is detected by an NFC component 720 installed at kiosk 500. The signal is transmitted to the remote server (see FIG. 2) which can determine if the signal is authentic and verify the user. In response, a command is sent to the computing system for the kiosk 500 to initiate the fabrication of the debit card. In FIG. 8, an isolated portion of the kiosk 500 is shown, where the display 610 now instructs the account holder 450 to take a temporary debit card 810 from a dispenser slot 890. In different embodiments, the debit card 810 can include features standard on such cards, such as a chip 850, cardholder information 820 (e.g., name of cardholder, account number of cardholder, a magstripe, company contact information, etc.), and institution name 840 (e.g., "ABC Bank Debit Card"). In some embodiments, additional information such as message 830 may be printed or attached as a decal to a surface of the card that alerts the carrier that the card is highly limited in its functions ("This is a temporary debit card. See restrictions and limitations on back of card"). In one embodiment, the specific preferences/system settings regarding the card's limitations will be printed or otherwise presented on one side of the card (see FIG. 10).

Figure 9:
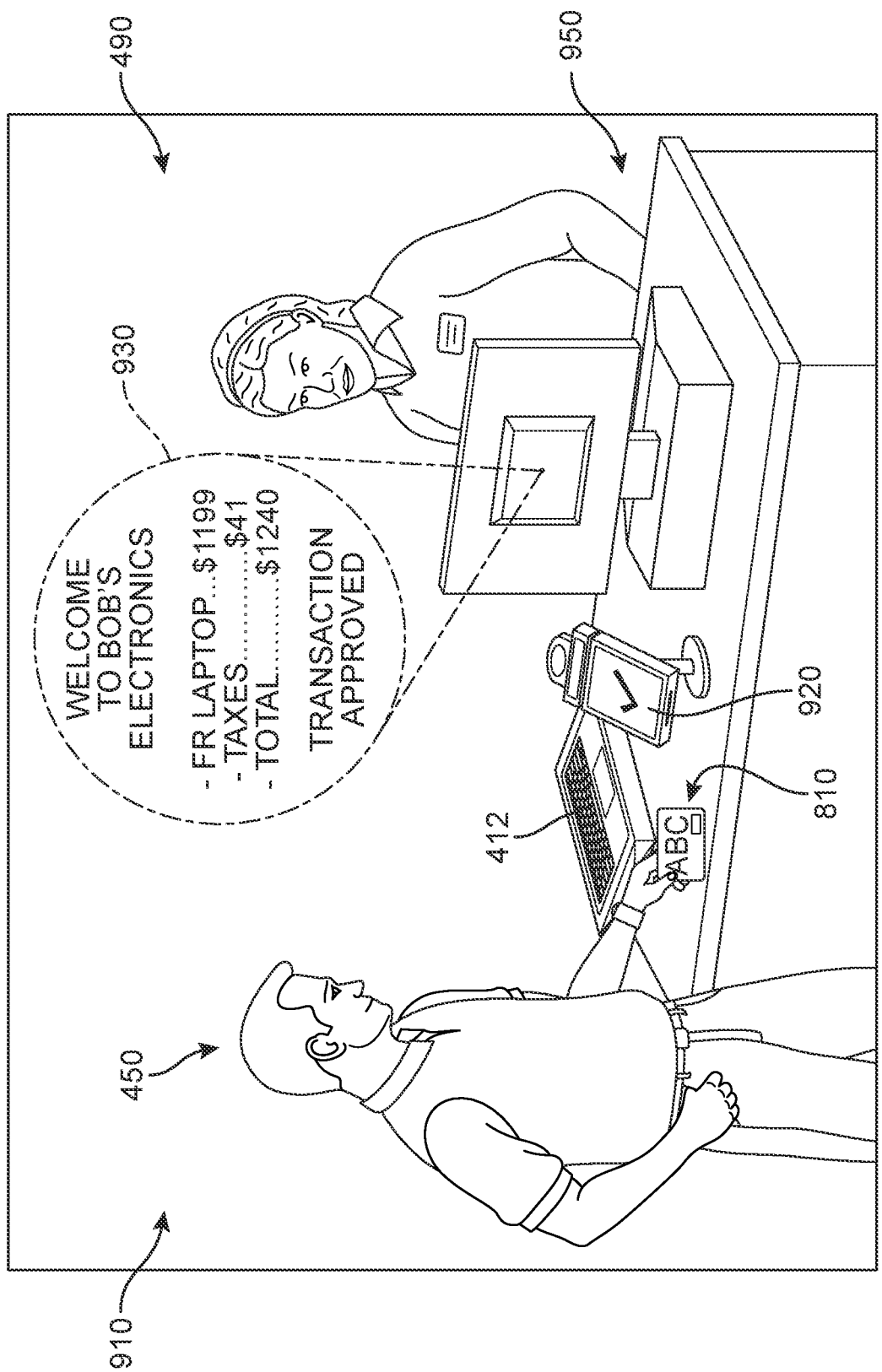
FIG. 9 shows the second person successfully completing a transaction at the store using their temporary debit card, according to an embodiment.

In FIG. 9, the account holder 450 has returned to the store 490 with his new card 810. He carries the first laptop 412 to a checkout counter 950 and presents his card 810 to a card scanner 920 that is configured to communicate with the designated financial institution. The account holder 450 will also enter the PIN that he had previously selected for use with the card 810, was automatically generated for him via the app on his mobile device, or one that the financial institution transmitted to him following the request for the temporary debit card, for example via text or email or voice. The bank can verify that the card usage is authorized, and/or whether the card use falls into the limited categories for card use (see FIG. 10). The purchase is approved as shown in a transaction summary 930, and the account for account holder 450 is successfully debited.

Figure 10:
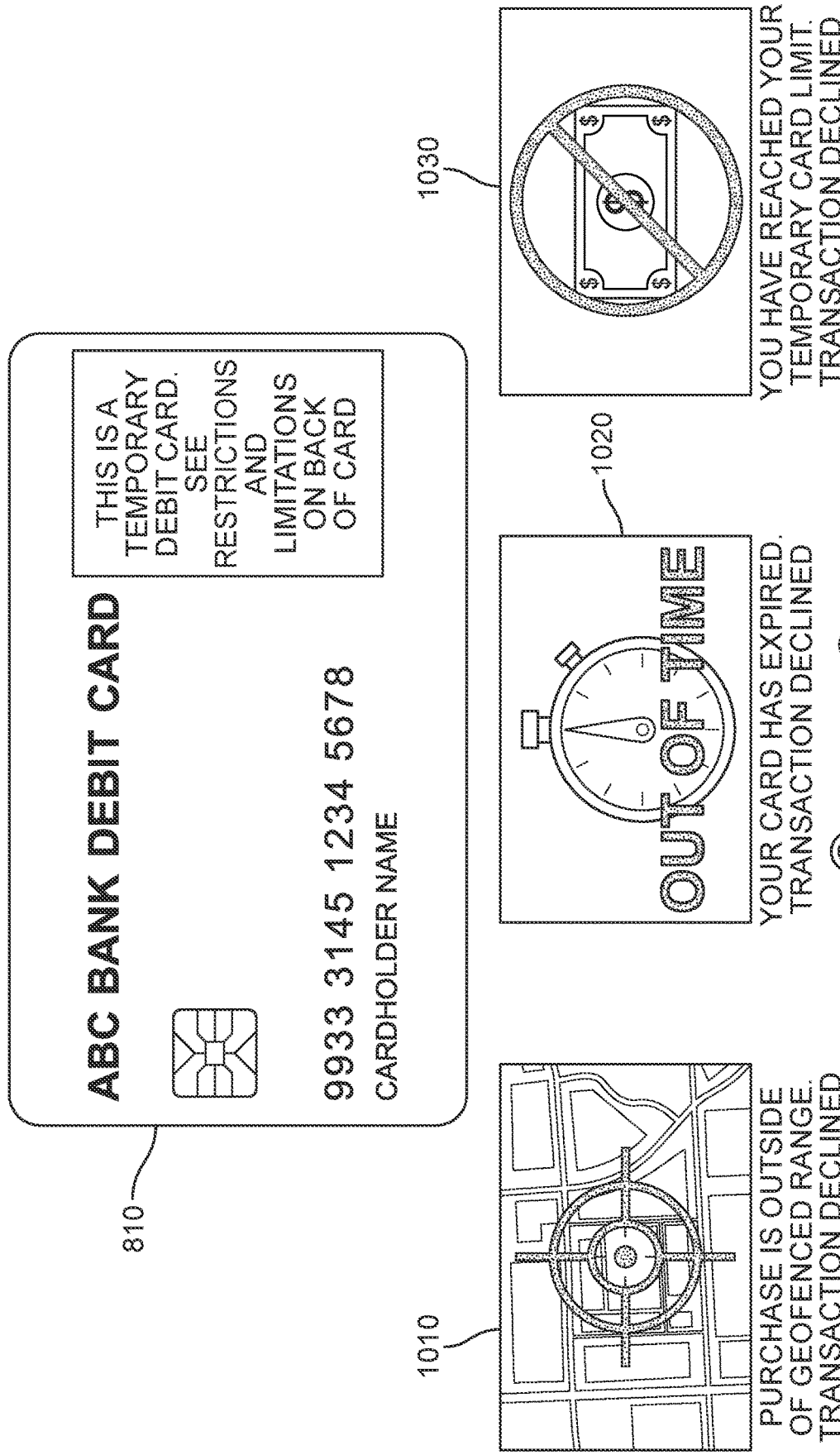
FIG. 10 presents some examples of protective restrictions that can be employed by the proposed systems, according to an embodiment.

As noted earlier, in different embodiments, the system includes provisions for minimizing fraudulent or otherwise undesirable use of the debit card by the implementation of one or more protective measures. Some examples of these protective features whereby a card can become disabled or otherwise trigger a block on a transaction are depicted in FIG. 10. A first protective restriction 1010 is based on the location in which a transaction involving the card 810 is occurring. In different embodiments, the system is configured to apply a virtual geographic boundary, enabling software of the system to trigger a response when it determines that the card 810 is being used in outside of a particular area or within a particular area. For example, the system may permit card use activity (i.e., the card will be valid) when the transaction is being conducted within a ten mile (or other distance) radius of their billing or residential address. For purposes of this example, account holder 450 of FIGS. 4-9 may live around eight miles from the first geographical location of store 490, and was thus permitted to use the card 810. However, if the transaction was more than ten miles from his residence based on the data received from the card reader at the store, the transaction would have been blocked by the system. In other examples, the radius can be based on the distance of the store 490 to the kiosk 500, or the first geographical location to the second geographical location. In such cases, if the store 490 were greater than "X" miles away from the kiosk that was used to generate the card, the transaction at that store would also be blocked. In yet another example, the system can enforce a restriction whereby, regardless of where the debit card is produced, it may only be used/enabled while the user makes transactions in a specific pre-designated zone, such as a radius around the cardholder's home address or business address. In some other embodiments in which the transaction is occurring via an online payment processor which may not have a particular geographical location, the system can be configured to only permit transactions for items that are being shipped to the account holder's billing or residential address, and/or addresses stored in their account preferences, or when used for a payment of a service that is provided locally (within the specified distance).

A second protective restriction 1020 is based on the period of time that the card will function before being disabled. For example, the system may be configured to establish a window of time (e.g., one hour, two hours, ten hours, one day, several days), or apply a previous user-selected preference, in which the card remains active. This window can begin as soon as the signal for fabrication is transmitted from the server, or alternatively can begin from when the first transaction occurs. Once that window has closed, the card is expired and becomes completely nonoperational and will no longer be able to be used for any transaction. In another example, rather than the system establishing this period of time, the physical chip on the card will become disabled after a specific period of time, preventing future use.

A third protective restriction 1030 is based on the number of transactions and/or the amount of money to be debited by the transactions. More specifically, the system can be configured to only allow the card to be a 'single-use' payment method, such that the card becomes defunct following one transaction. In another example, the card can be enabled for two, three, or more transactions, as established by the system settings and/or user preferences, before being disabled. In yet another example, the system is configured to limit the amount of money that the card can access, regardless of whether the funds in the account exceed that maximum amount. More specifically, the card can have a $200 (or some other amount) maximum use limit, such that a transaction that would cause more than $200 total to be removed from the account would be blocked. It should be understood that a temporary debit card manufactured by the kiosk would, for purposes of security, invariably incorporate at least one of these protective restrictions, but can also apply two or all three as well.

Figure 11:
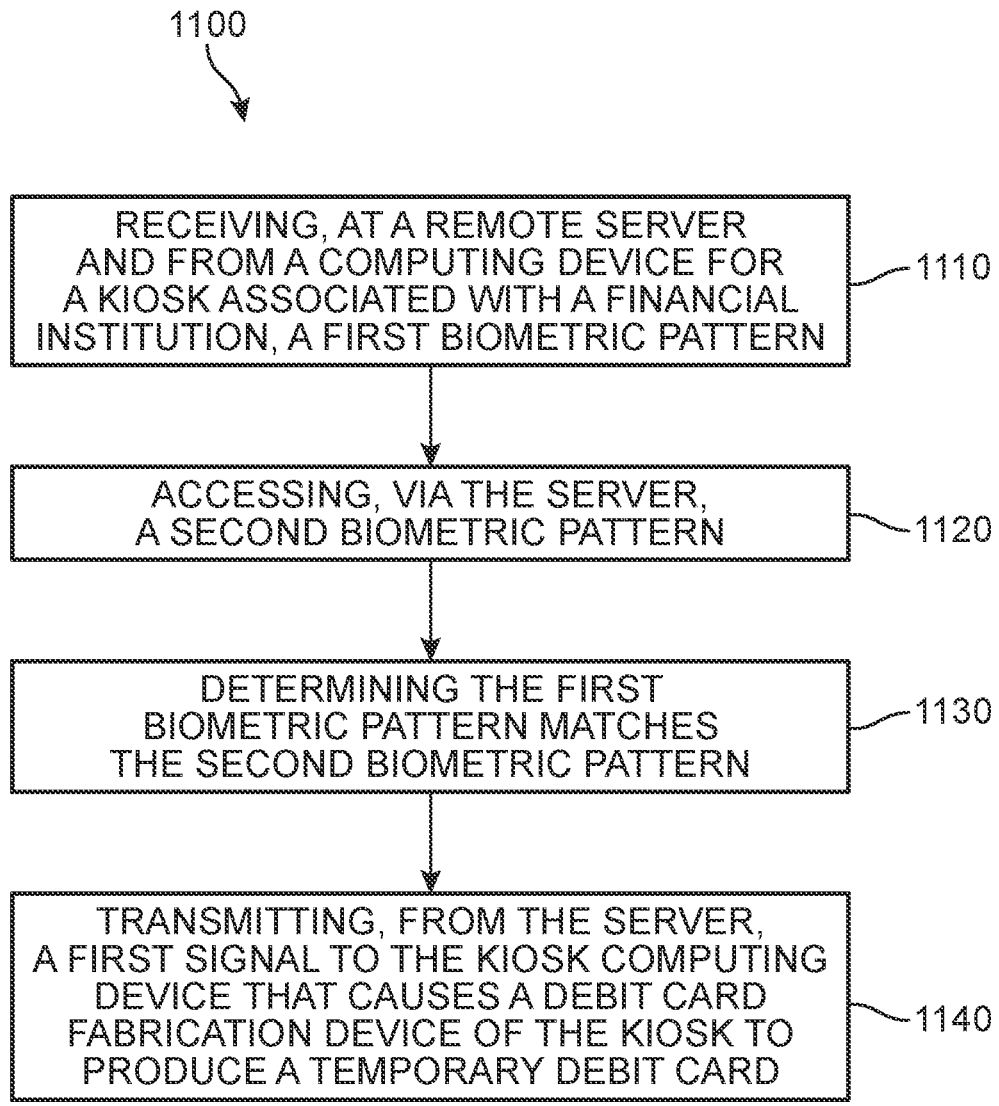
FIG. 11 is a flow chart depicting a process of providing access to a temporary debit card, according to an embodiment.

FIG. 11 is a flow chart illustrating an embodiment of a computer-implemented method 1100 of providing access to a temporary debit card by on-site fabrication of a debit card linked to a specific account. The method 1100 includes a first step 1110 of receiving, at a remote server and from a computing device for a kiosk associated with a financial institution, a first biometric pattern (i.e., a digital measurement of a person's physical features or characteristics), and a second step 1120 of accessing, via the server and in response to receiving the first biometric pattern, a second biometric pattern. A third step 1130 includes determining, at the server, the first biometric pattern is sufficiently similar to the second biometric pattern so as to be classified as a match. In addition, a fourth step 1140 includes transmitting, from the server and in response to determining there is a match, a first signal to the kiosk computing device, the first signal causing a debit card fabrication device of the kiosk to produce a temporary debit card.

In other embodiments, the method may include additional steps or aspects. In one embodiment, the method 1100 also includes steps of receiving, at the server and prior to receiving the first biometric pattern, the second biometric pattern from a first person via a biometric input device, and storing, via the server, the second biometric pattern in a record linked to a first account for the first person. In such cases, the temporary debit card is configured to draw money directly from the first account when being used to complete a transaction. In some embodiments, the method 1100 further includes steps of receiving, at the server and prior to receiving the first biometric data, a request for a temporary debit card from the kiosk computing device, the request including a first identifier, and determining, at the server, that the first identifier corresponds to an identifier for the first person or the first account. In one example, the record further includes one or more preferences selected by the first person regarding the type of protective restriction to be enforced during use of the temporary debit card.

In another embodiment, the first biometric pattern is captured via a biometric input device installed in the kiosk and connected to the kiosk computing device. In another example, the first biometric pattern is one of a retinal scan, fingerprint scan, facial scan, hand scan, and voiceprint. In one embodiment, the temporary debit card is valid only for a limited time period. In some cases, the temporary debit card is only valid for up to a preset and limited number of transactions. In another example, the temporary debit card is valid for transactions that are performed only within a predefined geographical boundary. In still another example, the temporary debit card is only valid for access to a preselected amount of money.

Other methods can also be contemplated within the scope of this disclosure. For example, a computer-implemented method of producing a temporary debit card includes a first step of receiving, at a remote server and from a computing device for a kiosk associated with a financial institution, first data transmitted via a near-field communication (NFC)-based signal from a mobile device to the kiosk computing device, verifying, at the server, the first data, and transmitting, from the server and in response to verification of the first data, a first signal to the kiosk computing device. The first signal includes authorization and/or instructions to proceed with the request. The first signal is processed by the kiosk computing device and causes a debit card fabrication device for the kiosk and connected (either wirelessly or with a wired connection) to produce (fabricate) a temporary debit card that is linked to a specific account.

In other embodiments, the method may include additional steps or aspects. In one embodiment, the method also includes steps of generating, at the server and at a time prior to receiving the first data, second data that includes first data, and sending, from the server, the second data to an app running on the mobile device. In one example, the kiosk receives the NFC-based signal via an NFC receiver component connected to the kiosk computing device. In another example, the request for a temporary debit card is initiated through the app. In some embodiments, the NFC-based signal is emitted via a feature of the app.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LAN (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for fabricating a temporary debit card associated with a user, the method comprising:
   receiving, at a remote server and from a kiosk computing device in a kiosk associated with a financial institution, a first biometric pattern;
   accessing, via the remote server and in response to receiving the first biometric pattern, a record containing a second biometric pattern known to be associated with the user;
   determining, at the remote server, the first biometric pattern is sufficiently similar to the second biometric pattern so as to be classified as a match; and
   transmitting, from the remote server and in response to determining there is a match, a first signal to the kiosk computing device, the first signal causing a debit card fabrication device in the kiosk to produce a temporary debit card including a physical chip that becomes disabled after a predetermined period of time, and cardholder information;
   wherein the kiosk further includes a display screen, a keypad, and a sensor panel that is configured to receive the biometric data from the user, the sensor panel including one or more of a retinal scanner and a fingerprint scanner;
   wherein the step of determining that the first biometric pattern is sufficiently similar to the second biometric pattern as to be classified as a match includes processing of the first biometric pattern with a match determination module that is configured to generate a matching score between the first biometric pattern and the second biometric pattern, and the first biometric pattern is considered a match to the second biometric pattern when the score exceeds a minimum predetermined threshold;
   wherein the record further includes one or more preferences selected by the user regarding a type of protective restriction to be enforced during use of the temporary debit card.

2. The method of claim 1, further comprising:
   receiving, at the remote server and prior to receiving the first biometric pattern, the second biometric pattern from a first person via a biometric input device that is part of the kiosk; and
   storing, via the remote server, the second biometric pattern in a record linked to a first account for the first person.

3. The method of claim 1, wherein the debit card fabrication device in the kiosk is configured to receive user-specific account information and fabricate the debit card using the user-specific account information to physically configure one or more aspects of the debit card.

4. The method of claim 2, further comprising:
   receiving, at the remote server and prior to receiving the first biometric data, a request for a temporary debit card from the kiosk computing device, the request including a first identifier; and
   determining, at the remote server, that the first identifier corresponds to an identifier for the first person or the first account.

5. The method of claim 3, wherein the debit card fabrication device is configured to fabricate the debit card with one or more physical characteristics selected from the group consisting of: a name of a cardholder, an account number of a cardholder, a magstripe, a company contact, an institution name, and system settings associated with limitations on the debit card.

6. The method of claim 1, wherein the kiosk receives an input from the user via one or more of the display screen and the keypad, in addition to the biometric data prior to the fabricating device in the kiosk producing the debit card, the input from the user being identifying information used to identify the user in conjunction with the biometric data.

7. The method of claim 1, wherein the temporary debit card is only valid for up to a preset and limited number of transactions.

8. The method of claim 1, wherein the temporary debit card is valid for transactions that are performed only within a predefined geographical boundary.

9. A method for fabricating a temporary debit card, the method comprising:
   receiving, at a remote server and from a computing device for a kiosk associated with a financial institution, first biometric data transmitted via a near-field communication (NFC)-based signal from a mobile computing device associated with a user to the kiosk computing device;
   the first biometric data being at least one of a retinal scan, a fingerprint scan, a facial scan, and a hand scan;
   verifying, at the remote server, the first data;
   transmitting, from the remote server and in response to verification of the first data, a first signal to the kiosk computing device, the first signal causing a debit card fabrication device for the kiosk to produce a temporary debit card including a physical chip that becomes disabled after a predetermined period of time, and cardholder information;
   generating, at the remote server and at a time prior to receiving the first data, second data that includes first data; and
   sending, from the remote server, the second data to an app running on the mobile computing device;
   wherein the kiosk further includes a display screen, a keypad, and a sensor panel that is configured to receive the first data via the NFC based signal from the mobile computing device associated with the user, the sensor panel including a passive Radio-Frequency Identification (RFID) tag, that is energized by electromagnetic waves broadcast by the mobile computing device;

wherein the kiosk receives an input from the user via one or more of the display screen and the keypad, in addition to the first data via the NFC based signal prior to the fabricating device in the kiosk producing the debit card, the input from the user being identifying information used to identify the user in conjunction with the first biometric data.

10. The method of claim 9, wherein the debit card fabrication device in the kiosk is configured to receive user-specific account information and fabricate the debit card using the user-specific account information to physically configure one or more aspects of the debit card.

11. The method of claim 9, wherein a request for a temporary debit card is initiated through the app.

12. A system for fabricating a temporary debit card associated with a user, the system comprising a processor and machine-readable media including instructions which, when executed by the processor, cause the processor to:

receive, at a remote server and from a kiosk computing device for a kiosk associated with a financial institution, a first biometric pattern;

access, via the remote server and in response to receiving the first biometric pattern, a second biometric pattern known to be associated with the user;

determine, at the remote server, the first biometric pattern is sufficiently similar to the second biometric pattern so as to be classified as a match; and transmit, from the remote server and in response to determining there is a match, a first signal to the kiosk computing device, the first signal causing a debit card fabrication device in the kiosk to produce a temporary debit card including a physical chip that becomes disabled after a predetermined period of time, and cardholder information;

wherein the kiosk further includes a display screen, a keypad, and a sensor panel that is configured to receive the biometric data from the user, the sensor panel including one or more of a retinal scanner and a fingerprint scanner;

wherein the step of determining that the first biometric pattern is sufficiently similar to the second biometric pattern as to be classified as a match includes processing of the first biometric pattern with a match determination module that is configured to generate a matching score between the first biometric pattern and the second biometric pattern, and the first biometric pattern is considered a match to the second biometric pattern when the score exceeds a minimum predetermined threshold;

wherein the kiosk receives an input from the user via one or more of the display screen and the keypad, in addition to the biometric data prior to the fabricating device in the kiosk producing the debit card, the input from the user being identifying information used to identify the user in conjunction with the biometric data;

wherein the temporary debit card is only valid for access to a preselected amount of money.

13. The system of claim 12, wherein the instructions further cause the processor to:

receive, at the remote server and prior to receiving the first biometric pattern, the second biometric pattern from a first person via one or more of the retinal scanner and the fingerprint scanner; and store, via the remote server, the second biometric pattern in a record linked to a first account for the first person.

14. The system of claim 13, wherein the instructions further cause the processor to:

receive, at the remote server and prior to receiving the first biometric data, a request for a temporary debit card from the kiosk computing device, the request including a first identifier; and determine, at the remote server, that the first identifier corresponds to an identifier for the first person or the first account.

15. The system of claim 12, wherein the debit card fabrication device in the kiosk is configured to receive user-specific account information and fabricate the debit card using the user-specific account information to physically configure one or more aspects of the debit card; and wherein the debit card fabrication device is configured to fabricate the debit card with one or more physical characteristics selected from the group consisting of: a name of a cardholder, an account number of a cardholder, a magstripe, a company contact, an institution name, and system settings associated with limitations on the debit card.

* * * * *